US007563538B2

(12) United States Patent
Miyazaki et al.

(10) Patent No.: US 7,563,538 B2
(45) Date of Patent: Jul. 21, 2009

(54) NONAQUEOUS ELECTROLYTE SECONDARY BATTERY

(75) Inventors: Shinya Miyazaki, Moriguchi (JP); Machiko Minoura, Niiza (JP)

(73) Assignee: Sanyo Electric Co., Ltd., Moriguchi-shi (JP)

( * ) Notice: Subject to any disclaimer, the term of this patent is extended or adjusted under 35 U.S.C. 154(b) by 61 days.

(21) Appl. No.: 12/016,486

(22) Filed: Jan. 18, 2008

(65) Prior Publication Data

US 2008/0213667 A1 Sep. 4, 2008

(30) Foreign Application Priority Data

Jan. 23, 2007 (JP) ............................ 2007-013087

(51) Int. Cl.
*H01M 4/48* (2006.01)

(52) U.S. Cl. ...................................... 429/231; 329/209

(58) Field of Classification Search ................. 429/231, 429/200, 326, 224, 223; 423/594
See application file for complete search history.

(56) References Cited

U.S. PATENT DOCUMENTS 5,783,333 A * 7/1998 Mayer ........................ 429/223
6,007,947 A * 12/1999 Mayer ..................... 429/231.1
6,379,842 B1 * 4/2002 Mayer ..................... 429/231.3
6,534,216 B1 * 3/2003 Narukawa et al. ........... 429/224
7,056,622 B2 * 6/2006 Imachi et al. ............ 429/231.1
2006/0194110 A1 * 8/2006 Miyazaki et al. ......... 429/231.3
2006/0222948 A1 * 10/2006 Kitao et al. .............. 429/231.1
2007/0172730 A1 * 7/2007 Iwanaga et al. ............. 429/200
2007/0178380 A1 * 8/2007 Iwanaga et al. .......... 429/231.4

FOREIGN PATENT DOCUMENTS

JP 4171659 A 6/1992
JP 2002198051 A 7/2002
JP 2003045426 A 2/2003
JP 2004047437 A 2/2004

* cited by examiner

*Primary Examiner*—Melvin C Mayes
*Assistant Examiner*—Colette Nguyen
(74) *Attorney, Agent, or Firm*—Westerman, Hattori, Daniels & Adrian, LLP.

(57) ABSTRACT

In a nonaqueous electrolyte secondary battery 10 containing a positive electrode 11 having a positive electrode active material capable of intercalating and deintercalating lithium ion; a negative electrode 12 having a negative electrode active material capable of intercalating and deintercalating lithium ion; and a nonaqueous electrolyte, the positive electrode active material contains both lithium cobalt oxide A in which 3 to 5 mol % of magnesium are homogeneously added and lithium cobalt oxide B in which 0.1 to 1 mol % of magnesium is homogeneously added which are mixed in a mixing ratio of lithium cobalt oxide A: lithium cobalt oxide B=2:8 to 8:2. By constituting a nonaqueous electrolyte secondary battery having the above constitution, a nonaqueous electrolyte secondary battery in which the thermal stability and the higher temperature cycle property are remarkably improved without lowering the battery capacity and the load performance.

5 Claims, 1 Drawing Sheet

(related art)

NONAQUEOUS ELECTROLYTE SECONDARY BATTERY

BACKGROUND

1. Technical Field

The present invention relates to a nonaqueous electrolyte. Particularly, the present invention relates to a nonaqueous electrolyte secondary battery in which, without lowering of the battery capacity, thermal stability and cycle property at higher temperatures have been remarkably improved.

2. Related Art

With the rapid spread of portable electronic equipment, the specifications required of the batteries used in such equipment have become more stringent with every year, and there is particular requirement for batteries that are compact and thin, have high capacity and superior cycling characteristics, and give stable performance. In the field of secondary batteries, attention is focusing on lithium nonaqueous electrolyte secondary batteries, which have high energy density compared with other batteries. These lithium nonaqueous electrolyte secondary batteries are winning an increasingly large share of the secondary battery market.

FIG. 1 is a perspective view showing a cylindrical nonaqueous electrolyte secondary battery produced conventionally by sectioning the battery perpendicularly. A nonaqueous electrolyte secondary battery 10 uses a coil-shaped electrode body 14 produced by winding a positive electrode 11, a separator 13 and a negative electrode 12 which are laminated in this order, and is produced by a method including: disposing insulating plates 15 and 16 respectively on the top side and bottom side of the coil-shaped electrode body 14 to prepare a parts set; holding the parts set in the inside of a steel-made cylindrical battery outer packaging can 17 serving also as a negative electrode terminal; welding not only a power collecting tab 12*a* of the negative electrode 12 to an inside bottom of the battery outer packaging can 17, but also a power collecting tab 11*a* of the positive electrode 11 to a bottom plate of a current-intercepting opening-sealing body 18 with a built-in safety device; pouring a predetermined nonaqueous electrolyte through an opening of the battery outer packaging can 17; and sealing the battery outer packaging can 17 with the current-intercepting opening-sealing body 18. Such a nonaqueous electrolyte secondary battery has such an excellent effect that battery performance and reliability are high.

As a negative electrode active material used in the nonaqueous electrolyte secondary battery, carbonaceous materials such as graphite and an amorphous carbon are widely used, since carbonaceous materials have high safety because dendrites do not grow therein due to their discharge potential with lithium metal or lithium alloy, and also such excellent properties as excellent initial efficiency, advantageous potential flatness and high density.

Further, as a nonaqueous solvent of a nonaqueous electrolyte, carbonates, lactones, ethers and esters are used individually or in combination of two or more thereof. Among them, particularly carbonates having a large dielectric constant and having a large ion conductivity as the nonaqueous electrolyte thereof are frequently used.

It is known that as a positive electrode active material, when a lithium compound oxide such as lithium cobalt oxide ($LiCoO_2$), lithium manganese oxide ($LiMnO_2$), spinel-type lithium manganese oxide ($LiMn_2O_4$), lithium nickel oxide ($LiNiO_2$) and lithium iron oxide ($LiFeO_2$) is used in combination with a negative electrode consisting of a carbon material, a 4-V-class nonaqueous secondary battery having a high energy density can be obtained. Among them, particularly because of various battery properties more excellent than those of other materials, lithium cobalt oxide is frequently used. However, since cobalt is not only expensive, but also the existing amount of cobalt as a resource is small, for continued use of lithium cobalt oxide as a positive electrode active material of a nonaqueous electrolyte secondary battery, it is desired to make the nonaqueous electrolyte secondary battery having even higher performance and longer life.

For making the nonaqueous electrolyte secondary battery in which lithium cobalt oxide is used as a positive electrode active material, having even higher performance and longer life, it is essential to enlarge the capacity of the battery and improve the cycle life of the battery. Since lithium cobalt oxide as a positive electrode active material is exposed to an electric potential of 4 V or more based on lithium during charging the battery, when the charging-discharging cycle is repeated many times, cobalt in lithium cobalt oxide is dissolved out and the battery is deteriorated, so that the loading performance thereof is lowered and the discharging capacity is also lowered. Thus, during the synthesis of $LiCoO_2$ as a positive electrode active material, another transition element M is added and contained, so that different metal element-added lithium cobalt oxide represented by a general formula: $LiCo_{1-x}M_xO_2$ has been employed. With respect to the different metal element-added lithium cobalt oxide represented by a general formula: $LiCo_{1-x}M_xO_2$, since during the use thereof, the dissolution of cobalt is suppressed, various battery properties compared to those in the case where lithium cobalt oxide is used individually, have been achieved.

It is also known that when magnesium is used as this different metal element, particularly the thermal stability becomes excellent. For example, JP-A-4-171659 describes that by using lithium cobalt oxide to which magnesium is added as a positive electrode active material, a nonaqueous electrolyte secondary battery in which cycle property and charged state property at higher temperatures have been improved, is obtained. This magnesium-added lithium cobalt oxide is produced by a method including: mixing thoroughly lithium carbonate and magnesium carbonate which are weighed so that atom ratios of lithium and magnesium relative one atom of cobalt are respectively 0.5 to 1.0:0.5 to 0; and hydrolyzing the resultant mixture.

Further, JP-A-2002-198051 describes that by using as a positive electrode active material, different metal element-added and coprecipitated cobalt oxide obtained by coprecipitating a lithium compound and an added element M (wherein, the added element M is at least one selected from Mg, Al, Cu and Zn), a nonaqueous electrolyte secondary battery having a high active material specific capacity and excellent charging and discharging cycle property and capable of suppressing the increase of the battery thickness, can be obtained. Also, JP-A-2003-45426 describes that by using as a positive electrode active material, different metal element-added lithium cobalt oxide represented by a general formula: $Li_xCo_yM_zO_2$ (wherein, M is at least one element selected from Mg, Al, Si, Ti, Zn, Zr and Sn), the phase transition is suppressed and a degradation of the crystal structure is caused a little, so that not only while maintaining a high capacity, the thermal stability during the charging is improved, but also satisfactory charging-discharging property can be achieved.

Further, JP-A-2004-47437 describes that by using as a positive electrode active material, a material composed of particles of a compound oxide containing lithium and cobalt which is composed of an element M1 selected from the group consisting of Mg, Cu and Zn and an element M2 selected from the group consisting of Al, Ca, Ba, Sr, Y and Zr, wherein the element M1 is distributed uniformly in the above particles and the element M2 is distributed in the above particles more in the inside part than in the surface layer part, a nonaqueous electrolyte secondary battery in which without decreasing the tap density of the positive electrode active material, the improvement of the cycle property and the thermal stability can be achieved, can be obtained.

As described above, it is known that a nonaqueous electrolyte secondary battery using different metal element-added lithium cobalt oxide in which Mg or the like as a different metal element is homogeneously added by a coprecipitation during the synthesis of lithium cobalt oxide as a positive electrode active material exhibits excellent cycle property and thermal stability compared to a nonaqueous electrolyte secondary battery using lithium cobalt oxide individually. However, the more the adding amount of the different metal element in the different metal element-added lithium cobalt oxide is, not only is the battery capacity lower, but the cycle property of a nonaqueous electrolyte secondary battery is also lower. In contrast, by reducing the adding amount of the different metal element in the different metal element-added lithium cobalt oxide and by increasing the content of lithium cobalt oxide, making a nonaqueous electrolyte secondary battery having a high capacity can be just achieved; however, the cycle property and the thermal stability are lowered. Therefore, in a conventional nonaqueous electrolyte secondary battery, when a different metal element is added to lithium cobalt oxide as a positive electrode active material, it is difficult to achieve a balance between the improving effect of the cycle property, the thermal stability and the like and the enlarging of the battery capacity.

SUMMARY

The present inventors have made extensive and intensive studies toward solving the above problems accompanying the conventional art and as a result, it has been found that by using a positive electrode active material in which two types of different metal element-added lithium cobalt oxide differing from each other in the adding amount of magnesium, are mixed in a predetermined mixing ratio, a nonaqueous electrolyte secondary battery in which without lowering the battery capacity, the thermal stability and the cycle property at higher temperatures are remarkably improved can be obtained. Based on this finding, the present invention has been completed.

In other words, an advantage of some aspects of the present invention is to provide a nonaqueous electrolyte secondary battery in which by using as a positive electrode active material, a mixture produced by mixing two types of $LiCoO_2$ sintered so that at least magnesium is homogeneously dispersed in a predetermined mixing ratio, the thermal stability and the cycle property of the battery are remarkably improved particularly without lowering the battery capacity.

According to an aspect of the present invention, a nonaqueous electrolyte secondary battery includes a positive electrode having a positive electrode active material capable of intercalating and deintercalating lithium ion, a negative electrode having a negative electrode active material capable of intercalating and deintercalating lithium ion, and a nonaqueous electrolyte. In the nonaqueous electrolyte secondary battery, the positive electrode active material contains both lithium cobalt oxide A in which 3 to 5 mol % of magnesium are homogeneously added and lithium cobalt oxide B in which 0.1 to 1 mol % of magnesium is homogeneously added which are mixed in a mixing ratio of lithium cobalt oxide A: lithium cobalt oxide B=2:8 to 8:2.

It is necessary to use simultaneously lithium cobalt oxide A in which 3 to 5 mol % of magnesium are homogeneously added and lithium cobalt oxide B in which 0.1 to 1 mol % of magnesium is homogeneously added. When the adding amount of magnesium in lithium cobalt oxide A is less than 3 mol %, the thermal stability and the cycle property at higher temperatures are lowered. On the other hand, when the adding amount of magnesium in lithium cobalt oxide A is more than 5 mol %, the initial capacity and cycle property at higher temperatures of the battery are lowered. Further, when the adding amount of magnesium in lithium cobalt oxide B is less than 0.1 mol %, the thermal stability is lowered. On the other hand, when the adding amount of magnesium in lithium cobalt oxide B is more than 1 mol %, the cycle property at higher temperatures is lowered.

Further, it is essential to use a mixture in which the above lithium cobalt oxide A and lithium cobalt oxide B are mixed in a ratio of A: B=2:8 to 8:2 as a positive electrode active material. When the adding amount of magnesium in lithium cobalt oxide is too large, though the thermal stability is improved, the cycle property at higher temperatures is likely to be lowered; however, by adding a component (lithium cobalt oxide B) in which the adding amount of magnesium in lithium cobalt oxide is suppressed, the surface of the positive electrode active material is stabilized, so that the decomposition of the electrolyte is reduced and the lowering of the cycle property at higher temperatures is suppressed. When the adding ratio of lithium cobalt oxide A is too small, the thermal stability is lowered, and when the adding amount of lithium cobalt oxide A is too large, the cycle property at higher temperatures is impaired.

Further, examples of the nonaqueous solvent (organic solvent) constituting the nonaqueous electrolyte secondary battery may include carbonates, lactones, ethers and esters and these solvents can be used also in combination of two or more types thereof. Among them, carbonates, lactones, ethers, ketones and esters are preferred and carbonates are more preferred.

Specific examples of the above nonaqueous solvent may include ethylene carbonate (EC), propylene carbonate (PC), butylene carbonate (BC), vinylene carbonate (VC), cyclopentanone, sulfolane, 3-methylsulfolane, 2,4-dimethylsulfolane, 3-methyl-1,3-oxazolidine-2-one, dimethyl carbonate (DMC), methyl ethyl carbonate (MEC), diethyl carbonate (DEC), methyl propyl carbonate, methyl butyl carbonate, ethyl propyl carbonate, ethyl butyl carbonate, dipropyl carbonate, γ-butylolactone, γ-valerolactone, 1,2-dimethoxyethane, tetrahydrofuran, 2-methyl tetrahydrofuran, 1,3-dioxolane, methyl acetate, ethyl acetate and 1,4-dioxane.

As a solute of the nonaqueous electrolyte, a lithium salt used generally as a solute in a nonaqueous electrolyte secondary battery can be used. Examples of the lithium salt include $LiPF_6$, $LiBF_4$, $LiCF_3SO_3$, $LiN(CF_3SO_2)$, $LiN(C_2F_5SO_2)_2$, $LiN(CF_3SO_2)(C_4F_9SO_2)$, $LiC(CF_3SO_3$, $LiC(C_2F_5SO_2)_3$, $LiAsF_6$, $LiClO_4$, $Li_2B_{10}Cl_{10}$, $LiB_{12}Cl_{12}$ and a mixture thereof Among them, $LiPF_6$ (hexafluoro lithium phosphate) is preferably used. The amount of a solute dissolved in the nonaqueous solvent is preferably 0.5 to 2.0 mol/L. Further, a gel formed by causing a polymer to contain a nonaqueous solvent and a solute can be also used.

In a nonaqueous electrolyte secondary battery according to such an aspect, it is preferred that to at least one of the above lithium cobalt oxide A and lithium cobalt oxide B, further 0.01 to 1 mol % of zirconium is homogeneously added.

When both lithium cobalt oxide A and lithium cobalt oxide B contain magnesium, even with or without added zirconium, a result with a satisfactory thermal stability can be just obtained. However, when to only one of lithium cobalt oxides A and B, further 0.01 mol % or more of zirconium is added, the cycle property at higher temperatures becomes more satisfactory and when to both of lithium cobalt oxides A and B, further 0.01 mol % of zirconium is added, an extremely excellent cycle property at higher temperatures can be obtained. However, when the adding amount of zirconium in lithium cobalt oxide A or lithium cobalt oxide B is more than 1 mol %, rather the initial capacity is lowered, which is not preferred. When the adding amount of zirconium in lithium cobalt oxide A and lithium cobalt oxide B is less than 0.01 mol %, the effect of the zirconium adding is not exhibited.

In a nonaqueous electrolyte secondary battery according to such an aspect, it is preferred that the above lithium cobalt oxide A and lithium cobalt oxide B are produced using a cobalt compound obtained by coprecipitating cobalt with magnesium from an acid aqueous solution containing cobalt and magnesium. Further, it is preferred that the above lithium cobalt oxide A and lithium cobalt oxide B are produced using a cobalt compound obtained by coprecipitating cobalt with magnesium and zirconium from an acid aqueous solution containing cobalt, magnesium and zirconium.

In other words, in this case, it is necessary to cause a cobalt compound (for example, cobalt carbonate ($CoCO_3$), cobalt hydroxide ($Co(OH)_2$) and the like) as a raw material for synthesizing lithium cobalt oxide to contain magnesium or magnesium and zirconium as different metal elements by dispersing homogeneously the elements in the cobalt compound during the preparation thereof For example, by using a method such as a coprecipitation method, it becomes possible to disperse homogeneously a different element and a predetermined effect can be taken.

Further, in a nonaqueous electrolyte secondary battery according to such an aspect, it is preferred that the above negative electrode active material is composed of a carbonaceous material.

Since the battery voltage is expressed in the difference between a positive electrode potential and a negative electrode potential, by enlarging the battery voltage, the battery capacity can be enlarged. However, when as a negative electrode active material, a carbonaceous material having a low potential (about 0.1 V based on lithium) is used, a nonaqueous electrolyte secondary battery in which the battery voltage is high and the availability ratio of a positive electrode active material is high can be obtained. As the above carbonaceous material, a natural graphite, an artificial graphite, a carbon black, a coke, a glassy carbon and one of or a mixture of a plurality of the baked products of these materials can be used.

According to some aspects of the present invention, as described specifically below according to various Embodiments and Comparative Examples, a nonaqueous electrolyte secondary battery in which the thermal stability and the cycle property at higher temperatures are remarkably improved without lowering the battery capacity, can be obtained.

BRIEF DESCRIPTION OF THE DRAWINGS

The invention will be described with reference to the accompanying drawing, wherein like numbers reference like elements.

DESCRIPTION OF EXEMPLARY EMBODIMENTS

Figure 1:
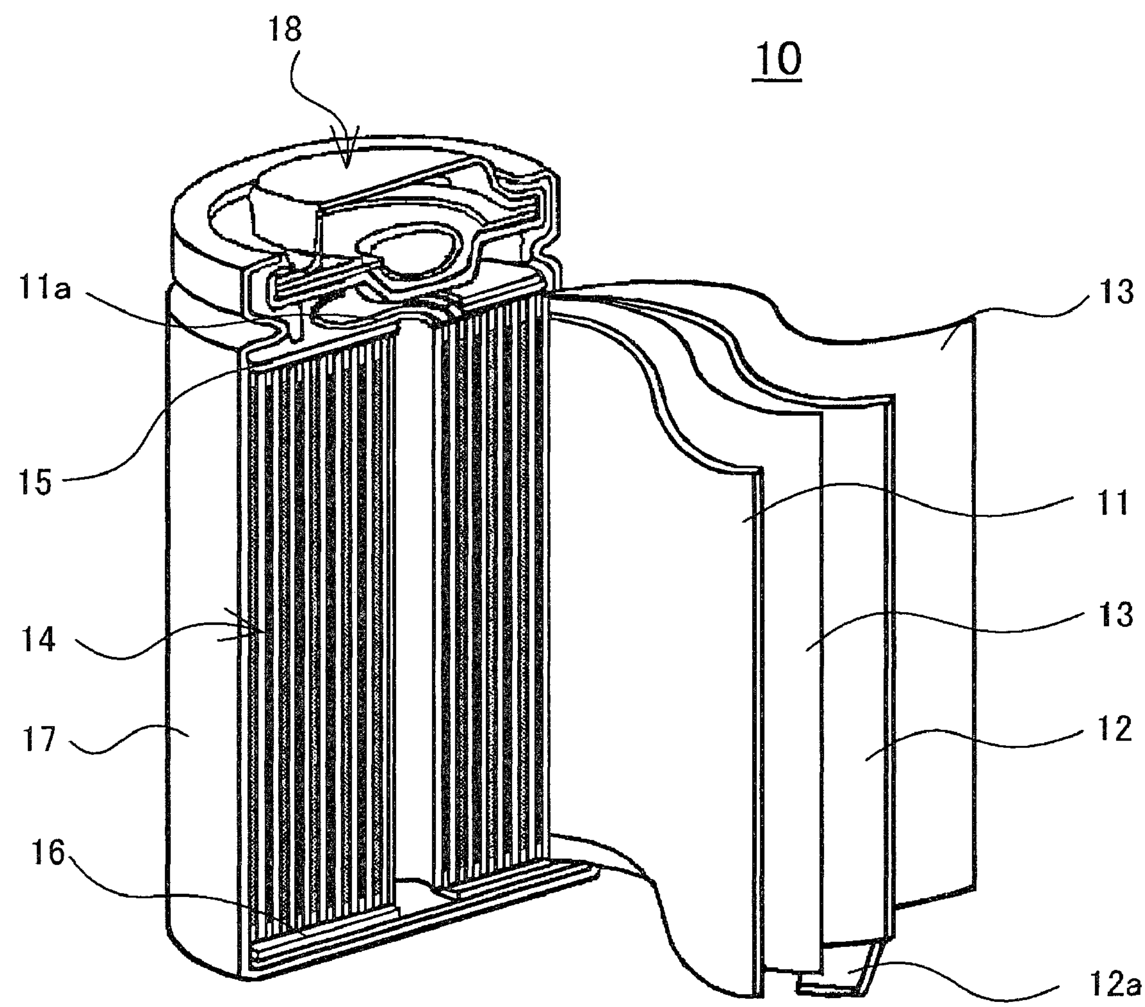
FIG. 1 is a perspective view showing a cylindrical nonaqueous electrolyte secondary battery by sectioning the battery perpendicularly.

Hereinafter, the best embodiments for carrying out the present invention are described more specifically referring to various Embodiments and Comparatives Examples. However, the following Embodiments illustrate only examples of a nonaqueous electrolyte secondary battery for embodying the technical concept of the present invention and it is not intended that the present invention is specified to these Embodiments, so that the present invention can be equally applied also to various modifications without departing from the technical concept shown in the Claims.

First to Third Embodiments

First, a specific production method of the nonaqueous electrolyte secondary batteries according to First to Third Embodiments is described.

Preparation of Positive Electrode Active Material

A different metal element-added lithium cobalt oxide as a positive electrode active material was prepared as follows. First, to an aqueous solution of cobalt sulfate ($CoSO_4$), 0.5 mol % relative to an amount of cobalt of zirconium sulfate ($Zr(SO_4)_2$) and an amount of magnesium sulfate ($MgSO_4$) by which the composition of the positive electrode active material becomes the composition shown in the following Table 1, are added. Thereafter, sodium hydrogen carbonate ($NaHCO_3$) was added to the resultant mixture to precipitate cobalt carbonate ($CoCO_3$) and to simultaneously coprecipitate zirconium and magnesium.

Since various ions are homogeneously mixed in the aqueous solution before adding sodium hydrogen carbonate, zirconium and magnesium are homogeneously dispersed in the obtained precipitation of cobalt carbonate. Thereafter, the cobalt carbonate formed through the coprecipitation of zirconium and magnesium was subjected to a thermal decomposition reaction in the presence of oxygen to obtain tri-cobalt tetra-oxide ($Co_3O_4$) as a starting material of cobalt source in which zirconium and magnesium are contained homogeneously by the coprecipitation.

Next, using lithium carbonate ($Li_2CO_3$) as a starting material of lithium source, lithium carbonate and tri-cobalt tetra-oxide in which zirconium and magnesium are contained homogeneously by the coprecipitation were weighed so that the molar ratio of lithium:cobalt becomes 5:5. Thereafter, these compounds were mixed in a mortar and the resultant mixture was sintered at 850° C. in air for 20 hours to synthesize a sinter of lithium cobalt oxide containing zirconium and magnesium. Thereafter, the synthesized sinter was ground to an average particle diameter of 10 μm to obtain lithium cobalt oxide A and lithium cobalt oxide B which have the adding amounts of magnesium differing from each other Lithium cobalt oxide A and lithium cobalt oxide B synthesized thus under a predetermined condition were further mixed in a formulation ratio of 5:5 to use as a positive electrode active material. The added amounts of zirconium and magnesium in the obtained positive electrode active material were determined by analyzing according to an ICP (Inductively Coupled Plasma) emission analysis method.

Preparation of Positive Electrode

The prepared positive electrode active material powder (to become 85 parts by mass in the composition shown in Table 1), a carbon powder as a positive electrode conductive material (to become 10 parts by mass in the composition shown in Table 1) and a polyvinylidene fluoride (PVdF) powder as a binder (to become 5 parts by mass in the composition shown in Table 1) were mixed so that the composition of the positive electrode becomes the composition shown in Table 1. Further, the resultant mixture was mixed with an N-methylpyrrolidone (NMP) solution to prepare a slurry. The slurry was applied to the both surfaces of an aluminum-made positive electrode power collecting body having a thickness of 20 μm by a doctor blade method to form an active material mixture layer on the both surfaces of the positive electrode power collecting body. The positive electrode power collecting body was dried and compressed using a compression roller to a thickness of 160 μm to prepare a positive electrode having a short side length of 55 mm and a long side length of 500 mm.

Preparation of Negative Electrode

A natural graphite powder (to become 95 parts by mass) and a PVdF powder (to become 5 parts by mass) were mixed and the resultant mixture was mixed with an NMP solution to prepare a slurry. Next, the slurry was applied to the both surfaces of a copper-made negative electrode power collecting body having a thickness of 18 μm by a doctor blade method to form an active material mixture layer on the both surfaces of the negative electrode power collecting body. The negative electrode power collecting body was dried and compressed using a compression roller to a thickness of 155 μm to prepare a negative electrode having a short side length of 57 mm and a long side length of 550 mm. The potential of graphite is 0.1 V based on Li. The active material packed amounts of the positive and negative electrodes were controlled such that at a potential of the positive electrode active material which is a design criterion, the charging capacity ratio between the positive and negative electrodes (negative electrode charging capacity/positive electrode charging capacity) becomes 1.1.

Preparation of Electrolyte

In a same-volume mixed solvent of ethylene carbonate (EC) and diethylene carbonate (DEC), $LiPF_6$ was dissolved such that the concentration thereof becomes 1 mol/L to prepare an electrolyte and the electrolyte was subjected to the preparation of the battery.

Preparation of Battery

Using the above positive electrode, negative electrode and electrolyte, the cylindrical nonaqueous electrolyte secondary batteries (height: 65 mm, diameter: 18 mm) having the compositions shown in Table 1 according to the First to Third Embodiments were prepared. As a separator, a polypropylene-made microporous film was used. A designed capacity of the produced nonaqueous electrolyte secondary batteries according to the First to Third Embodiments was 1600 mAh.

Next, the specific production methods of the nonaqueous electrolyte secondary batteries according to First to Eleventh Comparative Examples and Fourth to Fourteenth Embodiments are described.

FIRST TO FOURTH COMPARATIVE EXAMPLES

Nonaqueous electrolyte secondary batteries according to First to Fourth Comparative Examples were prepared in substantially the same manner as in the First to Third Embodiments, except that the amounts of magnesium added to lithium cobalt oxide A and lithium cobalt oxide B in the positive electrode active material were changed to those shown in Table 1.

FOURTH AND FIFTH EMBODIMENTS AND FIFTH AND SIXTH COMPARATIVE EXAMPLES

Nonaqueous electrolyte secondary batteries according to Fourth and Fifth Embodiments and Fifth and Sixth Comparative Examples were prepared in substantially the same manner as in the First to Third Embodiments, except that in lithium cobalt oxide A, the adding amount of magnesium was 3 mol % and the adding amount of zirconium was 0.5 mol %; in lithium cobalt oxide B, the adding amount of magnesium was 0.1 mol % and the adding amount of zirconium was 0.5 mol %; and the mixing ratio of lithium cobalt oxide A: lithium cobalt oxide B was varied to 1:9 (Fifth Comparative Example), 2:8 (Fourth Embodiment), 8:2 (Fifth Embodiment) and 9:1 (Sixth Comparative Example).

SIXTH TO TWELFTH EMBODIMENTS AND SEVENTH COMPARATIVE EXAMPLE

Nonaqueous electrolyte secondary batteries according to Sixth to Twelfth Embodiments were prepared in substantially the same manner as in the First to Third Embodiments, except that in lithium cobalt oxide A, the adding amount of magnesium was 3 mol % and the adding amount of zirconium was varied from 0 mol % to 2 mol % as shown in Table 3; and in lithium cobalt oxide B, the adding amount of magnesium was 0.1 mol % and the adding amount of zirconium was varied from 0 mol % to 2 mol % as shown in Table 3. Further, a nonaqueous electrolyte secondary battery according to Seventh Comparative Example was prepared in substantially the same manner as in the First to Third Embodiments, except that lithium cobalt oxide in which neither magnesium nor zirconium was added, was used individually.

THIRTEENTH AND FOURTEENTH EMBODIMENTS AND EIGHTH TO ELEVENTH COMPARATIVE EXAMPLES

Nonaqueous electrolyte secondary batteries according to Thirteenth and Fourteenth Embodiments and Eighth to Eleventh Comparative Examples were prepared in substantially the same manner as in the First to Third Embodiments, except that in lithium cobalt oxide A, zirconium was not added and the adding amount of magnesium was varied from 2 mol % to 6 mol % as shown in Table 4; in lithium cobalt oxide B, zirconium was not added and the adding amount of magnesium was varied from 0.1 mol % to 2 mol % as shown in Table 4.

Next, the measuring methods of various properties of the nonaqueous electrolyte secondary battery common to the Embodiments and the Comparative Examples, are described.

Measurement of Battery Initial Capacity

With respect to each of the batteries prepared as described above according to the First to Fourteenth Embodiments and the First to Eleventh Comparative Examples, each battery was charged at 25° C. using a constant current of 1 It=1600 mA and after the battery voltage reached 4.2 V, each battery was initially charged until the charging current value reached 30 mA, while maintaining the battery voltage at 4.2 V. Thereafter, the initially-charged battery was discharged using a constant current of 1 It until the battery voltage reached 2.75 V to measure the discharging capacity at this time as the initial capacity.

DSC Heat Evolution Starting Temperature

With respect to each of the batteries prepared according to the First to Fourteenth Embodiments and the First to Eleventh Comparative Examples, each battery was charged at 25° C. using a constant current of 1 It to 4.3 V, decomposed in a dry box, cleaned with dimethyl carbonate and vacuum-dried to prepare a sample. To 4 mg of the sample, 1 mg of ethylene carbonate was added and the sample was sealed in an aluminum-made cell in an argon atmosphere. The temperature of the sample was elevated with an elevating rate of 5° C./min using a differential scanning calorimeter to measure a temperature at which the self-heating is started.

Higher Temperature Cycle Test

Each battery was charged in a temperature environment of 60° C. using a constant current of 1 It=1600 mA and after the battery voltage reached 4.2 V, each battery was first-charged until the charging current value reached 30 mA, while maintaining the battery voltage at 4.2 V The first-charged battery was discharged using a constant current of 1 It until the battery voltage reached 2.75 V to measure the discharging capacity of the first cycle. Next, 300 cycles of such a charging-discharging cycle were performed repeatedly and according to the following calculation equation, the result of higher temperature cycle test (%) was calculated as a capacity maintained rate.

Higher temperature cycle test result (%)=(Discharging capacity of 300th cycle/Discharging capacity of first cycle)×100

The results of the First to Third Embodiments and the First to Fourth Comparative Examples are summarized in Table 1; the results of the Fourth and Fifth Embodiments and the Fifth and Sixth Comparative Examples are summarized together with the result of the First Embodiment in Table 2; the results of the Sixth to Twelfth Embodiments and the Seventh Comparative Example are summarized together with the result of the First Embodiment in Table 3; and the results of the Thirteenth and Fourteenth Embodiments and the Eighth to Eleventh Comparative Examples are summarized together with the result of the Sixth Embodiment in Table 4.

Table 1 shows the result of the case where with respect to each of lithium cobalt oxide A and lithium cobalt oxide B, the adding amount of zirconium was constant (0.5 mol %) and the adding amount of magnesium was varied. From the result shown in Table 1, the following is apparent. When the adding amount of magnesium in lithium cobalt oxide A becomes larger, the lowering of the initial capacity is observed. It can be recognized that when the adding amounts of zirconium and magnesium become larger, relatively the content of lithium cobalt oxide involved in an electrode reaction is decreased, which has led to the lowering of the battery capacity.

On the other hand, a case in which the DSC heat evolution starting temperature is more than 190° C. is the case where the adding amount of magnesium in lithium cobalt oxide A is 3 mol % or more. Further, a case in which the higher temperature cycle test result is more than 85% is the case where the adding amount of magnesium in lithium cobalt oxide A is 3 to 5 mol % and the adding amount of magnesium in lithium cobalt oxide B is 0.1 to 1 mol %. Thus, it is apparent that for satisfying both the condition in which the DSC heat evolution starting temperature is more than 190° C. and the condition in which the higher temperature cycle test result is 85% or more, it is preferred that the adding amount of magnesium in lithium cobalt oxide A is 3 to 5 mol % and the adding amount of magnesium in lithium cobalt oxide B is 0.1 to 1 mol %.

TABLE 1

| | Lithium cobalt oxide A | | Lithium cobalt oxide B | | | DSC | Higher |
|---|---|---|---|---|---|---|---|
| | Zr adding amount (mol %) | Mg adding amount (mol %) | Zr adding amount (mol %) | Mg adding amount (mol %) | Initial capacity (mAh) | heating starting temp. (° C.) | temp. cycle test result (%) |
| Compara. 1 | 0.5% | 2% | 0.5% | 0.1% | 1636 | 178 | 78 |
| Compara. 2 | 0.5% | 3% | 0.5% | 0% | 1635 | 184 | 86 |
| Embodi. 1 | 0.5% | 3% | 0.5% | 0.1% | 1636 | 193 | 85 |
| Embodi. 2 | 0.5% | 3% | 0.5% | 1% | 1634 | 193 | 86 |
| Compara. 3 | 0.5% | 3% | 0.5% | 2% | 1632 | 195 | 80 |
| Embodi. 3 | 0.5% | 5% | 0.5% | 0.1% | 1631 | 198 | 85 |
| Compara. 4 | 0.5% | 6% | 0.5% | 0.1% | 1611 | 198 | 80 |

Lithium cobalt oxide A:Lithium cobalt oxide B (molar ratio) = 5:5

TABLE 2

| | Lithium cobalt oxide A | | Lithium cobalt oxide B | | Mixing | | | |
|---|---|---|---|---|---|---|---|---|
| | Zr adding amount (mol %) | Mg adding amount (mol %) | Zr adding amount (mol %) | Mg adding amount (mol %) | ratio of A:B (molar ratio) | Initial capacity (mAh) | DSC heating starting temp. (° C.) | Higher temp. cycle test result (%) |
| Compara. 5 | 0.5% | 3% | 0.5% | 0.1% | 1:9 | 1634 | 182 | 84 |
| Embodi. 4 | 0.5% | 3% | 0.5% | 0.1% | 2:8 | 1635 | 192 | 86 |
| Embodi. 1 | 0.5% | 3% | 0.5% | 0.1% | 5:5 | 1636 | 193 | 85 |
| Embodi. 5 | 0.5% | 3% | 0.5% | 0.1% | 8:2 | 1635 | 193 | 85 |
| Compara. 6 | 0.5% | 3% | 0.5% | 0.1% | 9:1 | 1636 | 197 | 80 |

Table 2 shows a measuring result in the case where the composition of each of lithium cobalt oxide A and lithium cobalt oxide B was constant and the mixing ratio of lithium cobalt oxide A and lithium cobalt oxide B was varied. From the result shown in Table 2, the following is apparent. A case in which the DSC heat evolution starting temperature is more than 190° C. is the case where the mixing ratio of lithium cobalt oxide A: lithium cobalt oxide B is 2:8 to 9:1. Further, a case in which the higher temperature cycle test result is more than 85% is the case where the mixing ratio of lithium cobalt oxide A: lithium cobalt oxide B is 2:8 to 8:2.

It can be assumed that the above phenomenon is because though when the adding amount of magnesium in lithium cobalt oxide is too large, the thermal stability is improved and the high temperature cycle property is likely to be lowered, by adding a component in which the adding amount of magnesium in lithium cobalt oxide is suppressed (lithium cobalt oxide B), the surface of the positive electrode active material is stabilized, so that the decomposition of the electrolyte becomes a little and the lowering of the higher temperature cycle property has been suppressed. Therefore, it is apparent that for satisfying both the condition in which the DSC heat evolution starting temperature is more than 190° C. and the condition in which the higher temperature cycle test result is 85% or more, the mixing ratio of lithium cobalt oxide A: lithium cobalt oxide B is caused to be 2:8 to 8:2.

cobalt oxide B contain magnesium, regardless of the content of zirconium, the result of the DSC heat evolution starting temperature of more than 190° C. has been obtained and the higher temperature cycle test result has been obtained also as a more satisfactory result than that in the case where lithium cobalt oxide (individually) containing neither zirconium nor magnesium was used.

However, in the case where to only either lithium cobalt oxide A or lithium cobalt oxide B, further 0.01 mol % of zirconium was added, the higher temperature cycle test result has been obtained just as a satisfactory result. On the other hand, in the case where to both lithium cobalt oxide A and lithium cobalt oxide B, 0.01 mol % or more of zirconium was added, the higher temperature cycle test result has been obtained as an extremely excellent result. However, when the adding amount of zirconium in either lithium cobalt oxide A or lithium cobalt oxide B was 2 mol % or more, rather the initial capacity was lowered. On the other hand, when the adding amount of zirconium in both lithium cobalt oxide A and lithium cobalt oxide B was less than 0.01 mol %, the effect of adding zirconium has not been exhibited.

Therefore, it is apparent that in the case where each of lithium cobalt oxide A and lithium cobalt oxide B contains magnesium, when at least one of lithium cobalt oxide A and lithium cobalt oxide B contains 0.01 to 1.0 mol % of zirco-

TABLE 3

| | Lithium cobalt oxide A | | Lithium cobalt oxide B | | | DSC | Higher |
|---|---|---|---|---|---|---|---|
| | Zr adding amount (mol %) | Mg adding amount (mol %) | Zr adding amount (mol %) | Mg adding amount (mol %) | Initial capacity (mAh) | heating starting temp. (° C.) | temp. cycle test result (%) |
| Compara. 7 | 0% | 0% | 0% | 0% | 1636 | 167 | 65 |
| Embodi. 6 | 0% | 3% | 0% | 0.1% | 1636 | 192 | 70 |
| Embodi. 7 | 0% | 3% | 0.01% | 0.1% | 1635 | 192 | 83 |
| Embodi. 8 | 0.01% | 3% | 0% | 0.1% | 1635 | 193 | 83 |
| Embodi. 9 | 0.01% | 3% | 0.01% | 0.1% | 1635 | 194 | 85 |
| Embodi. 1 | 0.5% | 3% | 0.5% | 0.1% | 1636 | 194 | 85 |
| Embodi. 10 | 1% | 3% | 1% | 0.1% | 1633 | 193 | 85 |
| Embodi. 11 | 2% | 3% | 1% | 0.1% | 1610 | 194 | 85 |
| Embodi. 12 | 1% | 3% | 2% | 0.1% | 1609 | 194 | 85 |

Lithium cobalt oxide A:Lithium cobalt oxide B (molar ratio) = 5:5

Table 3 shows the result of the case where with respect to each of lithium cobalt oxide A and lithium cobalt oxide B, the adding amount of magnesium was constant and the adding amount of zirconium was varied, and the result of the case where neither zirconium nor magnesium was added in lithium cobalt oxide (individually) (Seventh Comparative Example). From the result shown in Table 3, the following is apparent. When both lithium cobalt oxide A and lithium nium, a nonaqueous electrolyte secondary battery having a just satisfactory thermal stability and higher temperature cycle test result can be obtained. However, it is also apparent that when both lithium cobalt oxide A and lithium cobalt oxide B contain further 0.01 to 1.0 mol % of zirconium, a nonaqueous electrolyte secondary battery having a more satisfactory thermal stability and a more satisfactory higher temperature cycle test result can be obtained.

TABLE 4

| | Lithium cobalt oxide A | | Lithium cobalt oxide B | | | DSC | Higher |
|---|---|---|---|---|---|---|---|
| | Zr adding amount (mol %) | Mg adding amount (mol %) | Zr adding amount (mol %) | Mg adding amount (mol %) | Initial capacity (mAh) | heating starting temp. (° C.) | temp. cycle test result (%) |
| Compara. 8 | 0% | 2% | 0% | 0.1% | 1636 | 177 | 65 |
| Compara. 9 | 0% | 3% | 0% | 0% | 1636 | 183 | 70 |
| Embodi. 6 | 0% | 3% | 0% | 0.1% | 1636 | 192 | 70 |
| Embodi. 13 | 0% | 3% | 0% | 1% | 1635 | 194 | 71 |
| Compara. 10 | 0% | 3% | 0% | 2% | 1634 | 197 | 66 |
| Embodi. 14 | 0% | 5% | 0% | 0.1% | 1631 | 197 | 71 |
| Compara. 11 | 0% | 6% | 0% | 0.1% | 1610 | 197 | 65 |

Lithium cobalt oxide A:Lithium cobalt oxide B (molar ratio) = 5:5

Table 4 shows the result of the case where with respect to each of lithium cobalt oxide A and lithium cobalt oxide B, zirconium was not added and the adding amount of magnesium was varied. From the result shown in Table 4, the following is apparent. A case where the DSC heat evolution starting temperature is more than 190° C. is the case where each of lithium cobalt oxide A and lithium cobalt oxide B contains magnesium.

On the other hand, in the case where the adding amount of magnesium in lithium cobalt oxide A is 3 mol %, when the adding amount of magnesium in lithium cobalt oxide B is 0 to 1 mol %, the result of the higher temperature cycle property of 70% or more has been obtained. However, when the adding amount of magnesium in lithium cobalt oxide B becomes 2 mol %, rather the higher temperature cycle property is lowered. Further, in the case where the adding amount of magnesium in lithium cobalt oxide B is 0.1 mol %, when the adding amount of magnesium in lithium cobalt oxide A is 3 to 5 mol %, the result of the higher temperature cycle property of 70% or more has been obtained; however, when the adding amount of magnesium in lithium cobalt oxide A is more than 5 mol %, rather the initial capacity and the higher temperature cycle property are impaired.

Therefore, it is apparent that in the case where both lithium cobalt oxide A and lithium cobalt oxide B do not contain zirconium, when the adding amount of magnesium in lithium cobalt oxide A is 3 to 5 mol % and the adding amount of magnesium in lithium cobalt oxide B is 0.1 to 1 mol %, the lowering of the initial capacity is not caused and the battery exhibits excellent thermal stability and excellent higher temperature cycle property. However, as is apparent from the comparison of the result shown in Table 4 with the result shown in Tables 1 to 3, by a battery in which both lithium cobalt oxide A and lithium cobalt oxide B contain not only magnesium but also zirconium, the most excellent result can be obtained.

What is claimed is:

1. A nonaqueous electrolyte secondary battery comprising:

a positive electrode having a positive electrode active material capable of intercalating and deintercalating lithium ion;

a negative electrode having a negative electrode active material capable of intercalating and deintercalating lithium ion; and a nonaqueous electrolyte, the positive electrode active material containing both lithium cobalt oxide A in which 3 to 5 mol % of magnesium are homogeneously added and lithium cobalt oxide B in which 0.1 to 1 mol % of magnesium is homogeneously added which are mixed in a mixing ratio of lithium cobalt oxide A: lithium cobalt oxide B=2:8 to 8:2.

2. The nonaqueous electrolyte secondary battery according to claim 1, wherein to at least one of the lithium cobalt oxide A and lithium cobalt oxide B, further 0.01 to 1 mol % of zirconium is homogeneously added.

3. The nonaqueous electrolyte secondary battery according to claim 1, wherein the lithium cobalt oxide A and lithium cobalt oxide B are produced using a cobalt compound obtained by coprecipitating cobalt with magnesium from an acid aqueous solution containing cobalt and magnesium.

4. The nonaqueous electrolyte secondary battery according to claim 2, wherein the lithium cobalt oxide A and lithium cobalt oxide B are produced using a cobalt compound obtained by coprecipitating cobalt with magnesium and zirconium from an acid aqueous solution containing cobalt, magnesium and zirconium.

5. The nonaqueous electrolyte secondary battery according to claim 1, wherein the negative electrode active material is composed of a carbonaceous material.

* * * * *